(12) United States Patent
Fernandes et al.

(10) Patent No.: US 7,722,910 B2
(45) Date of Patent: May 25, 2010

(54) PET FOOD COMPOSITION CONTAINING SEMI-REFINED GELLING AGENT

(75) Inventors: Paulo Fernandes, Amiens (FR); Annie Watelain, Lavieville (FR); Patrick Pibarot, Bayonvillers (FR)

(73) Assignee: Nestec S.A., Vevey (CH)

( * ) Notice: Subject to any disclaimer, the term of this patent is extended or adjusted under 35 U.S.C. 154(b) by 253 days.

(21) Appl. No.: 12/020,385

(22) Filed: Jan. 25, 2008

(65) Prior Publication Data

US 2008/0152774 A1 Jun. 26, 2008

Related U.S. Application Data

(60) Division of application No. 10/475,193, filed on Oct. 16, 2003, now Pat. No. 7,344,745, which is a continuation of application No. PCT/EP02/04015, filed on Apr. 10, 2002.

(30) Foreign Application Priority Data

Apr. 18, 2001 (EP) ................... 01201421

(51) Int. Cl.
*A23L 1/312* (2006.01)
*A23L 1/31* (2006.01)
(52) U.S. Cl. ................. 426/575; 426/574; 426/521; 426/805

(58) Field of Classification Search ................ 426/574, 426/575, 521, 805
See application file for complete search history.

(56) References Cited

U.S. PATENT DOCUMENTS

| 4,427,704 | A | | 1/1984 | Cheney et al. |
| 4,746,528 | A | | 5/1988 | Prest et al. |
| 4,791,002 | A | * | 12/1988 | Baker et al. ................. 426/641 |
| 6,270,830 | B1 | * | 8/2001 | Kamada et al. ............. 426/646 |

FOREIGN PATENT DOCUMENTS

| EP | 0 050 006 | 4/1982 |
| EP | 0 937 410 | 8/1999 |
| GB | 1 462 884 | 1/1977 |

* cited by examiner

*Primary Examiner*—C. Sayala
(74) *Attorney, Agent, or Firm*—K&L Gates LLP

(57) ABSTRACT

A pet food composition containing chunks and a clear gellified sauce or base, the composition being obtainable by: i) incorporating at least one semi-refined gelling agent and/or semi-refined gelling biopolymer blend, in a mixture comprising meat and meat by-products, the mixture being used for the manufacture of the chunks; ii) mixing the manufactured chunks with a sauce or base containing no gelling agent; and iii) treating the mixture under conditions to release the pure gelling agent molecules from the chunks into the sauce or base to gelify it and to achieve chunk structure.

5 Claims, No Drawings

PET FOOD COMPOSITION CONTAINING SEMI-REFINED GELLING AGENT

CROSS REFERENCE TO RELATED APPLICATIONS

This application is a divisional of U.S. application Ser. No. 10/475,193, filed Oct. 16, 2003, now U.S. Pat. No. 7,344,745, which is a continuation of International Application PCT/EP02/04015 filed Apr. 10, 2002, the content of which is expressly incorporated herein by reference thereto.

FIELD OF THE INVENTION

The present invention relates to pet food products containing chunks and sauce or base, and especially "chunks in jelly" products having improved gel clearness, chunk rigidity and processability. The invention also relates to a process of producing such pet food products.

BACKGROUND OF THE INVENTION

Today, the petfood industry is using mainly the glucomannan or galactomannan-kappa carrageenan mixed systems in the production of products of type loaf, chunks in loaf and chunks in jelly. Typically, the jelly is made using semi refined carrageenan. The galactomannan family consists in guar gum, tara gum, carob gum (or locust bean gum) and cassia gum; the glucomannan consists in konjac mannan gum.

In production, the restructured meat chunks are mixed with a semi refined carrageenan liquid jelly (with other hydrocolloids and dry ingredients) and go together into the can. After retorting the semi refined carrageenan makes the jelly of final product.

Because these products are using semi refined kappa carrageenan the jelly is somehow "cloudy". This cloudiness is due to the milder extraction procedure from algae which results in a carrageenan containing fragments of algal cell wall cellulose: of about 8-15% cellulosic material in the final composition of a typical semi refined carrageenan. In fact, the cellulose somehow precipitates during the retorting step and subsequently promotes the cloudiness of final gel. In reality, the meat just released from the chunks (containing some protein stuffs) may also complex with carrageenan cellulose precipitate, increasing even more the presence of precipitate material in the jelly.

The use of refined gelling agents, and particularly refined kappa carrageenan would improve the clearness of the final gel, but its use is quite limited in petfood industries due to high price, and semi refined material is largely used due to his low price.

Also, the chunk structure is achieved during the cooking and retorting steps mainly through animal or vegetable protein coagulation. Thus, the quality of the obtained chunks is highly dependant on the quality of the protein raw material. This is critical because of the variability of the supplier sources and because of the market crisis (e.g. BSE, GMO).

Therefore, the present invention aims to improve the chunk rigidity and the clearness of gels and global product quality control in petfood products, without using refined gelling agents and/or functional proteins.

SUMMARY OF THE INVENTION

Accordingly, in one aspect, this invention provides a pet food composition containing chunks and a clear gellified sauce or base, said composition being obtainable by:

i) incorporating at least one semi-refined gelling agent and/or semi-refined gelling biopolymer blend in a mixture comprising meat and meat by-products, said mixture being used for the manufacture of the chunks,
ii) mixing the manufactured chunks with a sauce or base containing no gelling agent and,
iii) treating the mixture under conditions to release the pure gelling agent molecules from the chunks into the sauce or base to gellify it and to achieve the chunk structure.

In a preferred embodiment, at least one oligosaccharide or oligosaccharide blend may be further incorporated in the mixture comprising meat and meat by-products.

Also, the sauce or base may contain a thickening and/or a stabilizing agent.

In fact, it has been surprisingly found that it was possible to prepare chunks in jelly products, using semi-refined gelling agents and/or semi-refined gelling biopolymer blend, and have in the final product a very clear gel. Indeed, during the manufacture of the composition, the cellulose material of semi refined gelling agents, especially carrageenan, precipitates during heat treatment (retorting) but is retained in the chunk structure which behaves like a filter and only the gelling molecules are released to the sauce or base.

Furthermore, the presence of polysaccharide in the chunk structure provides an additional firmness due to complex formation between sulfates groups of carrageenanes and ionic groups of proteins and possible covalent bonds formation between residual sugar from hydrolysis of gelling agent (i.e. galactose, mannose or others oligosaccharides) during the heat treatments and proteins. This structuration process can be reinforced by further addition of reducing oligosaccharides (e.g. xylose, galactose, glucose, . . . ).

This petfood composition has an improved gel clearness without the need to use refined gelling agents and an improved chunk rigidity and global product quality without using functional proteins.

The use of semi-refined gelling agent in the meat mix can be detected by qualitative analysis of the cellulose from gelling agent that precipitates in the chunk structure.

In another aspect, the invention relates to a process for preparing a pet food composition containing chunks and a clear sauce or base, comprising:

i) preparing a meat mixture which comprises meat and meat by-products and at least one semi refined gelling agent and/or semi-refined gelling biopolymer blend
ii) using the meat mixture to manufacture meat chunks,
iii) preparing a sauce or base without adding semi refined gelling agent
iv) mixing the meat chunks with the sauce or base and filling into a container
v) heating the container and contents to sterilize the contents.

DETAILED DESCRIPTION OF THE INVENTION

In the present description, meat and meat by-products are understood to mean all the fleshy parts of slaughtered warm-blooded animals in the fresh state or preserved by an appropriate treatment and all the products and by-products arising from the processing of the bodies or body parts of warm-blooded animals. Meat is understood to mean in particular the meat from chickens, rabbits, bovines or ovines and offal. Offal is understood to mean lung lobes as well as livers or kidneys. Meat by-products is understood to mean the meal obtained from carcasses of the above mentioned animals. In the present description, fish and fish by-products will be regarded as coming within the definition of meat and meat by-products. Fish and fish by-products are understood to mean fish or fish parts in the fresh state or preserved by an appropriate treatment, as well as the by-products of their processing. Salmon or sardines can be used as fish and fish meal can be used as by-products.

Also, semi refined gelling agents are understood to mean gelling agents partially or non refined, i.e. containing pure gelling agent molecules that promote a gel on the molecular basis of the transition from the "solution" to the "gel" state: it must involve some form of association of biopolymer/polysaccharide chains (junction zones) in order to produce a gel network structure (V. J. Morris, 1998, Gelation of Polysaccharides, In: Functional Properties of Food Macromolecules, eds S E Hill, D A Ledward & J R Mitchell, Aspen Publishers, pp. 143-226). Semi refined gelling agents are understood to mean gelling agents partially or non refined such like carrageenan, alginate, agar-agar, gellan, pectin, xanthan or association of those, among others. Typically, some gums that do not gelify alone when in mixture with other gums, due to synergistic interactions, present gelling properties (e.g. xanthan gum/glucomannan or galactomannan, etc) and may also be used as semi-refined gelling biopolymer blend.

Also, oligosaccharides are understood to mean either hydrolysis products from polysaccharides or added monosaccharides to react with protein.

In the present description, all the percentages are by weight unless otherwise indicated.

According to a first aspect, the invention relates to a petfood composition containing chunks and a clear gellified sauce or base, said composition being obtainable by:

i) incorporating at least one semi-refined gelling agent and/or semi-refined gelling biopolymer blend in a mixture comprising meat and meat by-products, said mixture being used for the manufacture of the chunks, ii) mixing the manufactured chunks with a sauce or base containing no gelling agent and, iii) treating the mixture under conditions to release the pure gelling agent molecules from the chunks into the sauce or base to gellify it and to achieve chunk structure.

The semi refined gelling agent according to the present invention may be carrageenan (in particular kappa carrageenan), alginate, agar-agar, gellan, pectin, xanthan or association of those, among others. The semi-refined gelling biopolymer blend may be in the form of mixture of gums which present gelling properties (e.g. xanthan gum/glucomannan or galactomannan, etc).

The semi refined gelling agent or biopolymer blend may be present in an amount of up to 10% by weight, based upon the total weight.

The presence of polysaccharide in the chunk structure provides an additional firmness due to complex formation between sulfates groups of carrageenanes and ionic groups of proteins and possible covalent bonds formation between residual sugar from hydrolysis of gelling agent (i.e. galactose, mannose or others oligosaccharides) during heat treatment.

This structuration process can be reinforced by further addition of reducing oligosaccharides. Accordingly, in a preferred embodiment, at least one oligosaccharide or oligosaccharide blend may be further incorporated in the mixture comprising meat and meat by-products. The oligosaccharide may be xylose, galactose, glucose, fructose, mannose, saccharose or other reducing pentose or hexose or association of those, for example. Preferably, the oligosaccharide may be added in an amount of 0 to 20% by weight, based upon the total weight.

Preferably, the chunks of the composition according to the invention contain less than 3% of particles having sizes of less than 4 mm. It is clearly understood that, depending on whether the composition is intended for cats or for dogs, the size of the chunks will be different. For dogs, 50 to 60% of the chunks will not pass through a screen with a mesh opening of 16 mm. For cats, on the other hand, only 5 to 15% of the chunks will not pass through a screen with a mesh opening of 14 mm, 45 to 65% of the chunks having a size of between 8 and 14 mm.

In the composition, the chunks may be present in a proportion of between 20 and 70%, the remainder being the sauce or the base. In the case of a composition with sauce, the chunks can be present in a proportion of 40 to 60% whereas, with a composition with base, the chunks can be present in a proportion of 10 to 50%.

The pet food may be produced as is conventional. Apart from the gelling agent according to the present invention, the pet food may include any one or more of a starch source, a protein source and lipid source.

Suitable starch sources are, for example, grains and legumes such as corn, rice, wheat, barley, oats, soy, and mixtures of these. Suitable protein sources may be selected from any suitable animal or vegetable protein source; for example meat and meal, poultry meal, fish meal, soy protein concentrates, milk proteins, gluten, and the like. For elderly animals, it is preferred for the protein source to contain a high quality protein. Suitable lipid sources include meats, animal fats and vegetable fats.

The choice of the starch, protein and lipid sources will be largely determined by the nutritional needs of the animal, palatability considerations, and the type of product produced. For elderly pets, the pet food preferably contains proportionally less fat than pet foods for younger pets. Further, the starch sources may include one or more of rice, barley, wheat and corn.

Further, various other ingredients, for example, sugar, salt, spices, seasonings, vitamins, minerals, flavouring agents, fats and the like may also be incorporated into the pet food as desired.

In a preferred embodiment, the chunks are prepared from a mixture containing 58 to 68% of meat and meat by-products, between 16 and 25% of cereals, between 2 and 5% of vegetable protein extracts and up to 10% of semi refined gelling agent, and 5 to 14% of water. The meats and meat by-products preferably comprise a minimum of 10% of pig or beef liver and from 0 to 5% of powdered pig or beef plasma and the cereals are present in a proportion of at least 10%, the said cereals being wheat, maize or rice flours, which makes it possible to ensure that the chunk at the cutting off has a sufficient texture and to avoid the production of fines and of tears. The chunks can additionally contain up to 3% of dyes, vitamins and inorganic salts.

The powdered plasma can advantageously be substituted by at least 2% of vegetable protein extracts which play the same role as the plasma Furthermore, the present invention provides the possibility to replace totally the animal or vegetal functional proteins (i.e. plasma, soya, . . . )

The chunks present in the composition can also be prepared from a mixture additionally containing between 0 and 5% of vegetable protein extract. Vegetable protein extract may be any product of plant origin, the proteins of which have been concentrated by an appropriate treatment, which contain at least 50% of crude proteins with respect to the dry matter and which may have been restructured. The proteins used are, for example, wheat or maize gluten or soya isolate.

In the mixture for preparing the chunks, the water content can be adjusted to between 0 and 15% according to the meat and cereal contents, in order to obtain a final moisture level of the chunks of preferably between 50 and 60% and more preferably between 52 and 58%, in order to ensure a correct content of the emulsion in the manufacturing process.

Before mixing the meat and meat by-products, a size reduction of the said meats may be carried out in order to arrive at sizes of the order of 12 mm. The meats (and optionally also the fish) are then mixed with the other ingredients (optionally also the vegetable protein extracts) of the chunk composition until homogenized, in order to obtain an elastic paste. Emulsification may then be carried out and the emulsified paste may then be pumped, with or without deaeration, to a continuous shaping system which makes it possible to extrude puddings. The pudding paste thus obtained may be cooked by any continuous cooking system (for example, hot air, steam, hot air and steam or microwave system) in order to obtain a core temperature of between 80 and 95° C. The puddings are thus congealed by coagulation and can be sliced at the outlet of the cooking device. The cooked coagulated paste is then continuously cut at the outlet of the cooking system into coagulated pieces with a length of 40 to 400 mm. The elongated pieces are then hardened by cooling to a temperature of between 10 and 40° C.: the cooling is preferably carried out with water by spraying or immersion in order to prevent the chunks from sticking to one another. It finally remains to cube the cooled pieces. In order to do this, use is made of a cuber known in the state of the art, such as the Urschel cuber.

According to the present invention, the viscosity of the meat mixture and the quality of the chunk cutting (i.e. less fines formation, better shape finition) are improved by the presence of the semi-refined gelling agent and/or added oligosaccharides, even in the absence of vegetable or animal functional protein.

The chunks thus obtained are mixed in a way known per se with the sauce or the base. Sauce is understood to mean a mixture containing up to 98% of water, the remainder being one or more thickeners, such as gums, dyes and flavouring agents. Base is understood to mean a mixture based on 60 to 80% of water and 20 to 40% of finely ground meats, the remainder being thickeners, dyes and aromas.

The sauce or base according to the present invention does not contain any gelling agent that promote a gel network as previously defined. Preferably, it contains a thickening and/or a stabilizing agent, suitable gums are locust bean gum, guar gum, cassia gum, carob gum and Konjac gum for example.

The pet foods are then filled into cans or other containers, the containers sealed, and the mixture is heat treated under conditions to release the pure gelling agent molecules from the chunks into the sauce or base to gellify it. Preferably, the product is retorted in the normal manner, e.g. the composition is finally sterilized conventionally at a temperature of between 120 and 135° C. for 20 to 100 min. Suitable equipment is commercially available.

The following examples are given by way of illustration only and in no way should be construed as limiting the subject matter of the present application. All percentages are given by weight unless otherwise indicated.

EXAMPLES

Examples 1 to 5

The gelling system used is composed of semi refined kappa carrageenan/semi refined carob gum/potassium chloride. The carob gum can be replaced by other galactomannans like tara gum or cassia gum and glucomannans like konjac gum.

The viscosity of the jelly can be adjusted using guar gum in order to proceed to filling cans either one step or two step filling.

Example 1

| Jelly | |
| --- | --- |
| Semi refined carob gum | 0.5% |
| Potassium chloride | 0.15% |
| Liquid caramel | 0.3% |
| Flavor system | 0.5% |
| Water | 97.35% |
| Chunk | |
| Semi refined kappa carrageenan | 1-1.5% |
| Animal meats | 78.5-79% |
| Meat meals | 10% |
| Plasma powder | 1.5% |
| Flavor system | 3% |
| Salt | 1.5% |
| Colorant | 1% |
| Water | 3% |

Example 2

| Jelly | |
| --- | --- |
| Cassia gum | 0.5% |
| Guar gum | 0.25% |
| Potassium chloride | 0.15% |
| Liquid caramel | 0.3% |
| Flavor system | 0.5% |
| Water | 97.1% |

Chunk

Recipe as in example 1

Example 3

| Jelly | |
| --- | --- |
| Konjac gum | 0.5% |
| Potassium chloride | 0.15% |
| Liquid caramel | 0.3% |
| Flavor system | 0.5% |
| Water | 97.35% |

Chunk
Recipe as in example 1

Example 4

Cat Composition "chunks in a Jelly"

| Jelly | |
| --- | --- |
| Semi refined carob gum | 0.5% |
| Potassium chloride | 0.15% |
| Liquid caramel | 0.3% |
| Flavor system | 0.5% |
| Water | 97.35% |
| Chunk | |
| Semi refined kappa carrageenan | 1-1.5% |
| Animal meats | 78.5-79% |
| Meat meals | 10% |
| Xylose | 1.5% |
| Flavor system | 3% |
| Salt | 1.5% |
| Colorant | 1% |
| Water | 3% |

Example 5

Cat Composition "Chunks in a Jelly"

| Jelly | |
| --- | --- |
| Semi refined carob gum | 0.5% |
| Potassium chloride | 0.15% |
| Liquid caramel | 0.3% |
| Flavor system | 0.5% |
| Water | 97.35% |
| Chunk | |
| Semi refined kappa carrageenan | 1-1.5% |
| Animal meats | 78.5-79% |
| Meat meals | 9% |
| Galactose | 2.0% |
| Plasma powder | 0.5% |
| Flavor system | 3% |
| Salt | 1.5% |
| Colorant | 1% |
| Water | 3% |

Example 6

Cat Composition "Chunks in a Sauce"

A mixture is prepared from 73% of animal meats, 16% of wheat flour, 2% of powdered beef plasma, 6.8% of water, 2.2% of dyes and 1% of semi refined iota/kappa carrageenan, 1% xylose, vitamins and inorganic salts. This mixture is emulsified at 12° C. and extruded in the form of a pudding paste. This pudding paste is cooked at a temperature of 90° C., and pieces with a length of 80 mm are cut. They are cooled to 30° C. and cut in order to obtain chunks. 45% of these chunks are mixed with 55% of sauce prepared from 98% of water, 1% of dye and 1% of guar gum. Tinplate cans are filled and sterilized.

Example 7

Cat Composition "Chunks in a Sauce"

A mixture is prepared from 73% of animal meats, 16% of wheat flour, 2% of powdered beef plasma, 6.8% of water, 2.2% of dyes and 1% of semi refined iota/kappa carrageenan, vitamins and inorganic salts. This mixture is emulsified at 12° C. and extruded in the form of a pudding paste. This pudding paste is cooked at a temperature of 90° C., and pieces with a length of 80 mm are cut. They are cooled to 30° C. and cut in the cuber in order to obtain chunks. 45% of these chunks are mixed with 55% of sauce prepared from 98% of water, 1% of dye and 1% of guar gum. Tinplate cans are filled and sterilized.

Example 8

Cat Composition "Chunks in a Base"

A mixture is prepared from 56% of animal meats, 16% of wheat flour, 2% of plasma, 10.8% of water and 2.2% of dyes, 1% of semi refined kappa carrageenan, 3% glucose and vitamins and inorganic salts. The preparation is then carried out as in Example 6, in order to obtain chunks. 30% of these chunks (having a water content of 58%) is incorporated in a base prepared from 23% of poultry carcass, 1% of guar gum, 1% of dye and aroma and 75% of water. Tinplate cans are then filled and sterilized.

Example 9

Cat Composition "Chunks in a Base"

A mixture is prepared from 56% of animal meats, 13% of fish, 16% of wheat flour, 2% of plasma, 10.8% of water and 2.2% of dyes, 1% of semi refined kappa carrageenan and vitamins and inorganic salts. The preparation is then carried out as in Example 6, in order to obtain chunks. 30% of these chunks (having a water content of 58%) is incorporated in a base prepared from 23% of poultry carcass, 1% of guar gum, 1% of dye and aroma and 75% of water. Tinplate cans are then filled and sterilized.

Example 10

Dog Food Composition

69% of animal meats is mixed with 20% of wheat flour, 1% of powdered beef plasma, 7.8% of water and 2.2% of dyes, 1% semi refined kappa carrageenan, and vitamins and inorganic salts. This mixture is emulsified at 12° C. and extruded in the form of a pudding paste. This pudding paste is cooked at a temperature of 90°, and pieces with a length of 80 mm are cut. They are cooled and cut in order to obtain chunks. 50% of these chunks are mixed with 50% of sauce prepared from 98% of water, 1% of dye and 1% of guar gum. Tinplate cans are filled and sterilized.

Example 11

Qualitative Analysis of the Cellulose from Kappa Carrageenan in the Chunks

The use of semi refined kappa carrageenan in the meat mix can be checked by qualitative analysis of the cellulose from kappa-carrageenan that precipitates in the chunk structure. The methodology used is the following:

separation by sieving of chunks from hot liquid jelly
extraction from the chunks the acid insoluble matter (cellulose fibers):
  200 g of product+200 ml concentrated sulfuric acid+600 ml desionized water,
  stirring and heating 100° C. during 6 hours
  stirring during one night
  stirring and heating 100° C. during 1 hour
  flitration
  rinsing with 2 liters of desionized water
  drying 2 hours 102° C.
  removing of fat in Buchi extraction station with petroleum benzine 2 hours
  drying 2 hours 102° C.
  powder qualitative analysis by RMN of the presence or not of cellulose from semi refined kappa carrageenan. (Glyn O. Phillips, 1996, Gums and Stabilisers for the Food Industry, 8, pp 403).

The invention claimed is:

1. A process for preparing a pet food composition containing chunks and a clear component, comprising:
  i) preparing a meat mixture which comprises meat and meat by-products and at least one semi-refined gelling agent,
  ii) using the meat mixture to manufacture meat chunks,
  iii) preparing the clear component without adding semi refined gelling agent,
  iv) mixing the meat chunks with the clear component and filling into a container,
  v) heating the container and contents to sterilize the contents and to cause cellulose present in the semi-refined gelling agent to precipitate into the chunks.

2. A process according to claim 1, wherein at least one oligosaccharide is further incorporated in the meat mixture.

3. A process according to claim 1 wherein the semi-refined gelling agent is a semi-refined gelling biopolymer blend.

4. A process according to claim 1 wherein the component is a sauce.

5. A process according to claim 1 wherein the component is a base.

* * * * *